United States Patent
Rahn

(10) Patent No.: US 9,768,865 B2
(45) Date of Patent: Sep. 19, 2017

(54) ARBITRARY WAVELOCKING OF AN OPTICAL TRANSMITTER USING EMBEDDED DATA SEQUENCES

(71) Applicant: Infinera Corporation, Sunnyvale, CA (US)

(72) Inventor: Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/514,731

(22) Filed: Oct. 15, 2014

(65) Prior Publication Data
US 2016/0112140 A1    Apr. 21, 2016

(51) Int. Cl.
| H04B 10/564 | (2013.01) |
| H04J 14/02 | (2006.01) |
| H04B 10/077 | (2013.01) |
| H04B 10/572 | (2013.01) |

(52) U.S. Cl.
CPC ....... *H04B 10/0775* (2013.01); *H04B 10/572* (2013.01); *H04J 14/0221* (2013.01)

(58) Field of Classification Search
CPC . H04B 10/572; H04B 10/0779; H04B 10/564
USPC ............................................. 398/79, 66, 43
See application file for complete search history.

(56) References Cited

U.S. PATENT DOCUMENTS

| 5,745,275 A * | 4/1998 | Giles .................... H04B 10/506 398/197 |
| 7,620,081 B2 * | 11/2009 | Shahine ................ H01S 5/0687 372/29.01 |
| 8,594,514 B2 | 11/2013 | Rahn |
| 2004/0223759 A1 * | 11/2004 | Fee ..................... H04B 10/2537 398/33 |
| 2011/0052207 A1 * | 3/2011 | Ishikawa ............... H01S 5/0687 398/182 |
| 2012/0121274 A1 * | 5/2012 | Fludger .................. H04B 10/61 398/208 |
| 2012/0189322 A1 * | 7/2012 | Mo ...................... H04B 10/516 398/188 |
| 2013/0071105 A1 * | 3/2013 | Chang ................. G01S 13/9303 398/25 |
| 2013/0170831 A1 * | 7/2013 | Rahn ................... H04B 10/0779 398/29 |

* cited by examiner

*Primary Examiner* — Oommen Jacob
(74) *Attorney, Agent, or Firm* — David L. Soltz

(57) ABSTRACT

An optical system includes an optical transmitter and a controller that determines a particular wavelength for a channel of the optical transmitter. The controller causes the optical transmitter to transmit a first optical signal with a first data sequence that is determined based on the particular wavelength, and determines a first optical power that is generated based on the first optical signal and the first data sequence. The controller causes the optical transmitter to transmit a second optical signal with a second data sequence that is determined based on the particular wavelength, and determines a second optical power that is generated based on the second optical signal and the second data sequence. The controller calculates a power difference between the first optical power and the second optical power, and causes the particular wavelength for the channel to be modified based on the calculated power difference.

14 Claims, 11 Drawing Sheets

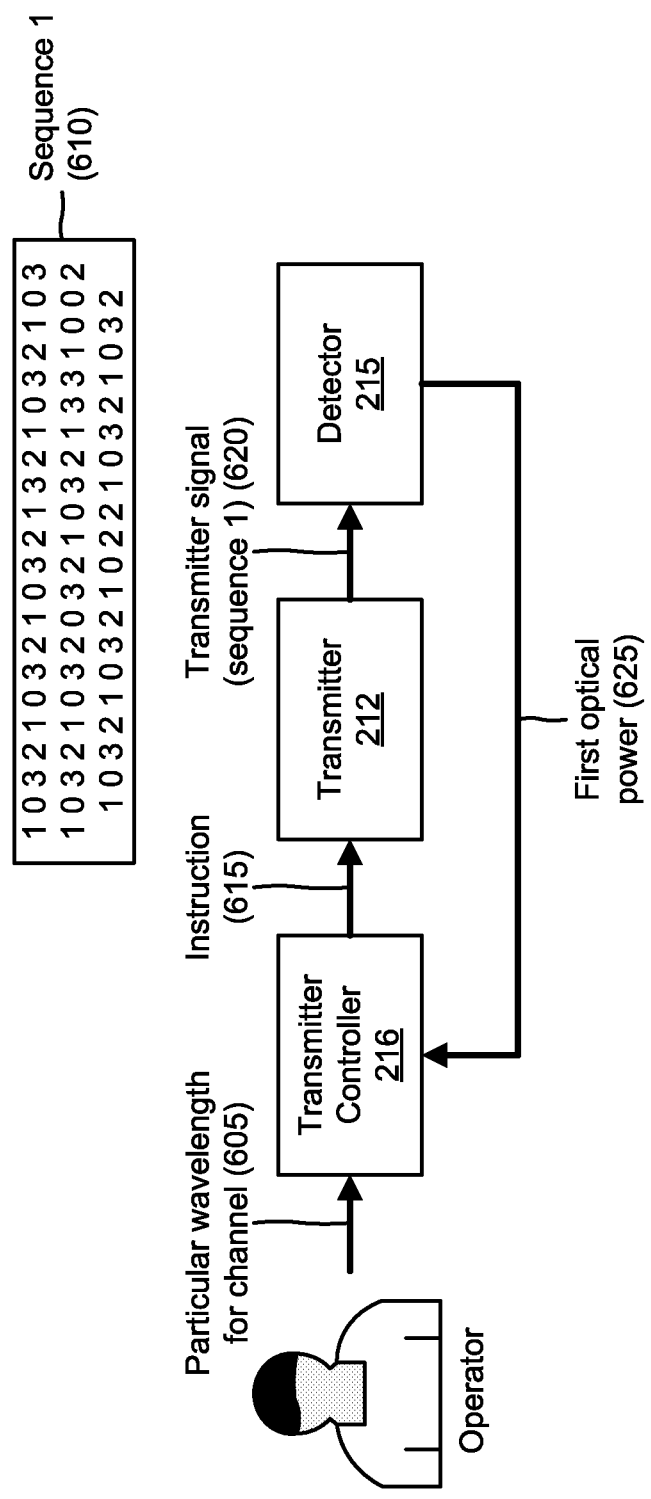

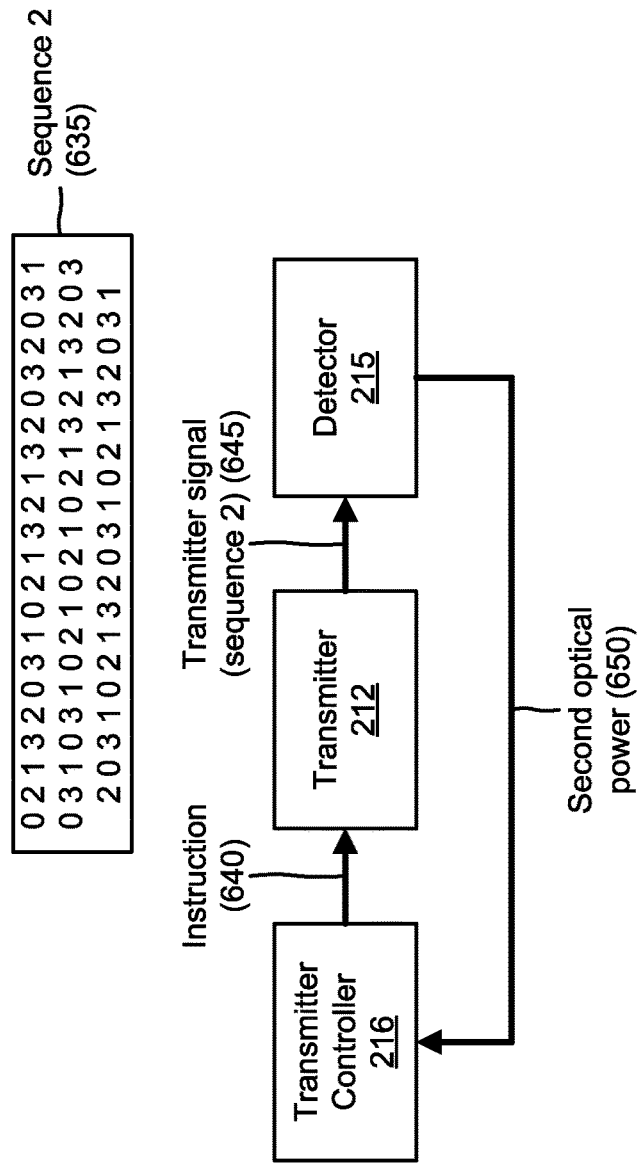

US 9,768,865 B2

ARBITRARY WAVELOCKING OF AN OPTICAL TRANSMITTER USING EMBEDDED DATA SEQUENCES

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component that includes a laser associated with each wavelength, a modulator configured to modulate the output of the laser, and a multiplexer to combine each of the modulated outputs (e.g., to form a combined output or WDM signal).

In a WDM system, the Tx PIC may modulate a phase of a signal in order to convey data (via the signal) to a receiver (Rx) PIC where the signal may be demodulated such that data, included in the signal, may be recovered. A particular modulation format (e.g., quadrature phase-shift keying (QPSK), quadrature amplitude modulation (QAM), or the like) may be used to modulate the input signal. Different modulation formats correspond to different distances that the input signal may be transmitted.

The Rx PIC may include a polarization beam splitter (PBS) to receive an optical signal (e.g., a WDM signal), split the received optical signal, and provide two optical signals (e.g., associated with orthogonal polarizations) associated with the received optical signal. The Rx PIC may also include an optical demultiplexer circuit (referred to as a "demultiplexer") configured to receive the optical signals provided by the PBS and demultiplex each one of the optical signals into individual optical signals. Additionally, the Rx PIC may include receiver components to convert the individual optical signals into electrical signals, and output the data carried by those electrical signals.

The Tx and Rx PICs, in an optical communication system, may support communications over a number of wavelength channels. For example, a pair of Tx/Rx PICs may support ten channels, each spaced by, for example, 18.75 GHz, 25 GHz, 37.5 GHz, and/or 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs. Alternatively, channel grids may support an arbitrary offset to these standardized frequencies.

SUMMARY

According to some possible implementations, an optical system may include an optical transmitter, a detector, and a controller configured to receive information associated with a particular wavelength for a channel of the optical transmitter, and instruct the optical transmitter to transmit a first optical signal with a first data sequence that is determined based on the particular wavelength. The controller may further be configured to receive, from the detector, a first optical power that is generated based on the first optical signal and the first data sequence, and instruct the optical transmitter to transmit a second optical signal with a second data sequence that is determined based on the particular wavelength. The controller may be configured to receive, from the detector, a second optical power that is generated based on the second optical signal and the second data sequence, determine a power difference between the first optical power and the second optical power, and cause the particular wavelength for the channel to be modified based on the determined power difference.

According to some possible implementations, an optical system may include an optical transmitter, and a controller configured to determine a particular wavelength for a channel of the optical transmitter, and cause the optical transmitter to transmit a first optical signal with a first data sequence that is determined based on the particular wavelength. The controller may be configured to determine a first optical power that is generated based on the first optical signal and the first data sequence, and cause the optical transmitter to transmit a second optical signal with a second data sequence that is determined based on the particular wavelength. The controller may be configured to determine a second optical power that is generated based on the second optical signal and the second data sequence, calculate a power difference between the first optical power and the second optical power, and cause the particular wavelength for the channel to be modified based on the calculated power difference.

According to some possible implementations, an optical system may include an optical transmitter configured to transmit a first optical signal with a first data sequence that is determined based on a particular wavelength for a channel of the optical transmitter, and transmit a second optical signal with a second data sequence that is determined based on the particular wavelength. The optical system may further include a detector configured to determine a first optical power based on the first optical signal and the first data sequence, determine a second optical based on the second optical signal and the second data sequence, and output the first optical power and the second optical power. The optical system may further include a controller configured to cause the optical transmitter to transmit the first optical signal and the second optical signal, receive the first optical power and the second optical power from the detector, determine a power difference between the first optical power and the second optical power, and cause the particular wavelength for the channel to be modified based on the determined power difference.

BRIEF DESCRIPTION OF THE DRAWINGS

FIGS. 6A-6F are diagrams of an example implementation relating to the example process shown in FIG. 6.

DETAILED DESCRIPTION

The following detailed description refers to the accompanying drawings. The same reference numbers in different drawings may identify the same or similar elements.

A detector may be utilized to control and/or lock wavelengths of transmitter signals (e.g., referred to herein as wavelocking). Some optical communication systems use a fixed wavelocking grid where each channel occupies a slot centered on a fixed grid. Wavelocking for a fixed grid may be accomplished by comparing a transmitter optical signal and a detector signal (e.g., a fixed etalon signal) with periodicity matching the fixed grid channel spacing (e.g., 25 gigahertz (GHz), 50 GHz, or the like).

Wavelength selective switch technology makes it possible to remove the constraint of a fixed grid alignment. Such technology requires the transmitters to align the channels to any grid locations. In a non-integrated optical system, channel alignment may be accomplished by using a detector (e.g., a thermally tuned etalon) and a process for setting the etalon temperature. To reach a particular wavelength, the etalon edge may be thermally tuned to match a closest desired grid location. In an integrated optical system, multiple transmitters may be simultaneously wavelocked, but tuning the etalon may only achieve a desired lock point for a single channel.

Systems and/or methods, described herein, may enable arbitrary wavelocking of an optical transmitter using embedded data sequences that generate optical power at a fixed frequency offset from a carrier optical signal. By selecting a data sequence corresponding to the fixed frequency offset, the systems and/or methods may enable locking a channel to an arbitrary wavelength.

Figure 1:
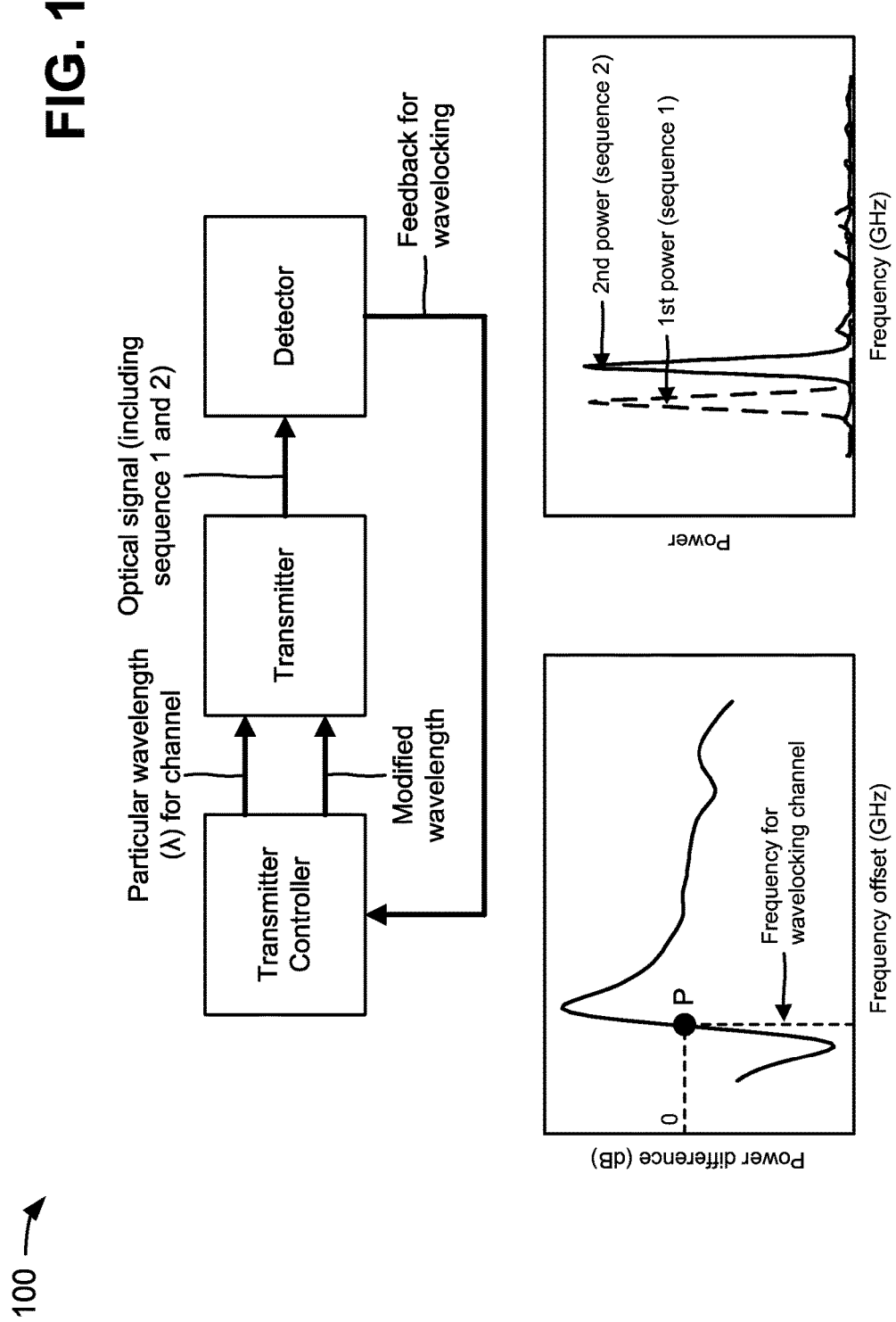
FIG. 1 is a diagram of an overview of an example implementation described herein.

FIG. 1 is a diagram of an overview of an example implementation 100 described herein. As shown in FIG. 1, a transmitter may be associated with a transmitter controller and a detector. The transmitter may be provided in an integrated optical system that includes multiple transmitters transmitting on different channels. The multiple transmitters may transmit multiple optical signals, of different wavelengths, that are combined onto a single optical fiber. In some implementations, an operator of the transmitter may select a particular wavelength (λ) for the transmitter signal, and the transmitter controller may receive information identifying the particular wavelength.

As further shown in FIG. 1, the transmitter controller may instruct the transmitter to generate an optical transmitter signal for a channel and at the particular wavelength. Based on the instruction, the transmitter may transmit a first optical transmitter signal that includes a first data sequence. The first data sequence may generate a first optical power at a fixed frequency offset from a carrier frequency, and the detector may detect the first optical power, as shown in the graph to the right in FIG. 1. The detector may provide an indication of the first optical power to the transmitter controller via feedback that may be used for wavelocking.

As further shown in FIG. 1, the transmitter may transmit a second optical transmitter signal that includes a second data sequence. The second data sequence may generate a second optical power at a fixed frequency offset from a carrier frequency, and the detector may detect the second optical power, as shown in a graph to the right in FIG. 1. The second optical power may be different than the first optical power. The detector may provide an indication of the second optical power to the transmitter controller via the feedback for wavelocking. The transmitter controller may average the first optical power, may average the second optical power, and may calculate a difference between the averaged first optical power and the averaged second optical power.

The calculated power difference may follow a characteristic response as the transmitter frequency offset is varied, as shown in the graph to the left in FIG. 1. The graph may include a plot showing the calculated power difference (e.g., in decibels (dB)) at different frequencies (e.g., in GHz). The transmitter controller may seek a point (P) on the plot where the power difference goes through zero dB, as shown in FIG. 1. The frequency may include a frequency where the transmitter's carrier signal is offset from the detector's fixed frequency, and may be referred to as a wavelocking frequency or a frequency offset. The transmitter controller may modify the particular wavelength to a modified wavelength, based on the wavelocking frequency, and may instruct the transmitter to generate an optical transmitter signal for the channel at the modified wavelength. Based on the instruction, the transmitter may transmit the optical transmitter signal at the modified wavelength.

Systems and/or methods, described herein, may enable arbitrary wavelocking of an optical transmitter using embedded data sequences that generate optical power at a fixed frequency offset from a carrier optical signal. By selecting a data sequence corresponding to the fixed frequency offset, the systems and/or methods may enable locking a channel to an arbitrary wavelength. The systems and/or methods may enable multiple transmitters and multiple channels, in an integrated optical system, to be simultaneously wavelocked to any arbitrary wavelength. The systems and/or methods may provide an accurate and spectrally efficient integrated optical system since channel wavelengths may have very precise relative alignment.

Figure 2:
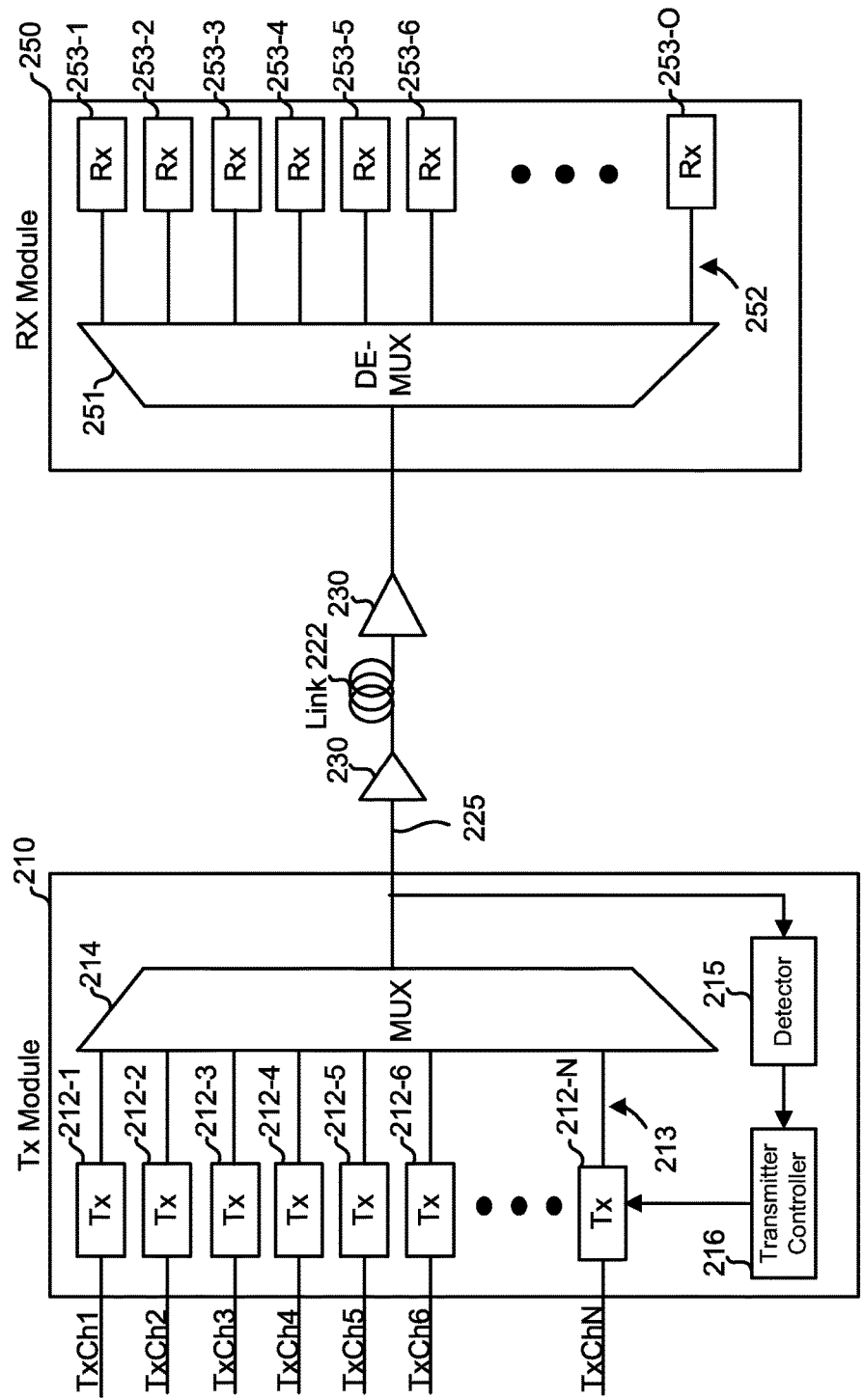
FIG. 2 is a diagram of an example network in which systems and/or methods, described herein, may be implemented.

FIG. 2 is a diagram of an example network 200 in which systems and/or methods, described herein, may be implemented. As shown in FIG. 2, network 200 may include a transmitter module 210 (e.g., a Tx PIC) and/or a receiver module 250 (e.g., an Rx PIC). In some implementations, transmitter module 210 may be optically connected to receiver module 250 via a link 222 and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (N≥1), waveguides 213, an optical multiplexer 214, a detector 215, and/or a transmitter controller 216. Each optical transmitter 212 may receive a data channel (TxCh1 through TxChN), may modulate the data channel with an optical signal, and may transmit the data channel as an optical signal. In some implementations, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include a power splitter, a tunable filter array, a wavelength-selective switch, a liquid-crystal on silicon filter, an arrayed waveguide grating (AWG), and/or some other multiplexing device. In some implementations, optical multiplexer 214 may combine multiple signal channels, associated with optical transmitters 212, into a wave division multiplexed (WDM) signal, such as an optical signal 225.

Detector 215 may include one or more devices that detect an optical signal and output an electrical signal based on the detected optical signal. In some implementations, detector 215 may output a particular electrical signal based on a filtered version of the detected optical signal. In some implementations, detector 215 may include a tone detection circuit utilizing a photodiode configured to determine an optical power value at a particular frequency based on receiving an optical signal including an out-of-band tone. In some implementations, detector 215 may include an etalon filter that produces a predetermined frequency response function. The etalon filter may be configured according to a set of parameters, such as free-spectral range, extinction ratio, or the like. In some implementations, the etalon filter may be a temperature sensitive etalon filter, and the predetermined frequency response function may be adjusted when a temperature associated with the etalon filter is adjusted.

Transmitter controller 216 may include one or more devices that provide, to one or more devices within transmitter module 210, signals that control conditions associated with an optical signal generated by transmitter module 210. In some implementations, transmitter controller 216 may be separate from and external to transmitter module 210. In some implementations, transmitter controller 216 may be implemented as a processor, a microprocessor, an ASIC, an FPGA, or the like. In some implementations, transmitter controller 216 may monitor and/or control optical signals generated by transmitter 212, and may adjust the optical signals based on comparing one or more out-of-band tones inserted therein against a predetermined etalon response function.

As further shown in FIG. 2, receiver module 250 may include an optical demultiplexer 251, waveguides 252, and/or optical receivers 253-1 through 253-O (O≥1). In some implementations, optical demultiplexer 251 may include a power splitter, a tunable filter array, a wavelength-selective switch, a liquid-crystal on silicon filter, an AWG, and/or some other demultiplexing device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

The number and arrangement of devices shown in FIG. 2 are provided for explanatory purposes. In practice, there may be additional devices, fewer devices, different devices, or differently arranged devices than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of network 200 may perform one or more functions described as being performed by another one or more of the devices of network 200.

Figure 3:
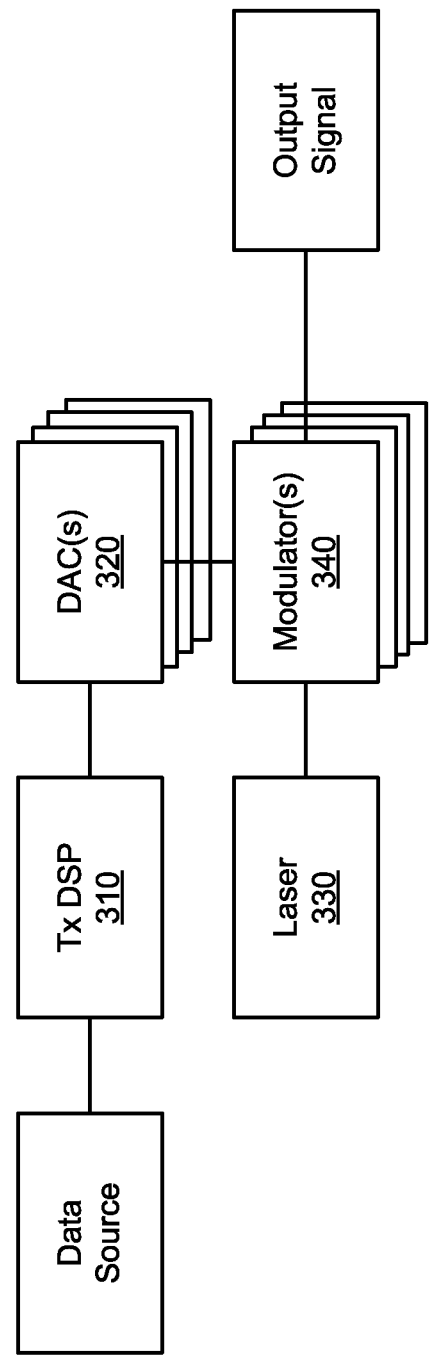
FIG. 3 is a diagram of example components of an optical transmitter shown in FIG. 2.

FIG. 3 is a diagram of example components of optical transmitter 212 shown in network 200 of FIG. 2. As shown in FIG. 3, optical transmitter 212 may include a transmitter (Tx) digital signal processor (DSP) 310, one or more digital-analog converters (DACs) 320, a laser 330, and/or one or more modulators 340. In some implementations, Tx DSP 310, DACs 320, laser 330, and/or modulators 340 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

Tx DSP 310 may include a digital signal processor or a collection of digital signal processors. In some implementations, Tx DSP 310 may receive a data source (e.g., a signal received via a Tx channel), may process the signal, and may output digital signals having symbols that represent components of the signal (e.g., an in-phase x-polarization component, a quadrature x-polarization component, an in-phase y-polarization component, and a quadrature y-polarization component).

DAC 320 may include a signal converting device or a collection of signal converting devices. In some implementations, DAC 320 may receive respective digital signals from Tx DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular polarization (e.g., an x-polarization, a y-polarization) of a signal and/or a particular component of a signal (e.g., an in-phase component, a quadrature component).

Laser 330 may include a semiconductor laser, such as a distributed feedback (DFB) laser, or some other type of laser. Laser 330 may provide an output optical light beam to modulator 340. In some implementations, laser 330 may include a laser that generates and/or transmits an optical signal at a particular wavelength and/or with a particular bandwidth. In some implementations, laser 330 may tune and/or calibrate the optical signal based on an instruction received from transmitter controller 216. In some implementations, laser 330 may increase or decrease a wavelength of the optical signal in order to enable a condition (e.g., thermal drift), associated with the optical signal, to be remedied or mitigated.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple sub-carrier output signal, which may be provided to multiplexer 214.

In some implementations, optical transmitter 212 may include multiple modulators 340, which may be used to modulate signals of different polarizations. For example, an optical splitter may receive an optical light beam from laser 330, and may split the optical light beam into two branches: one for a first polarization (e.g., an x-polarization) and one for a second polarization (e.g., the y-polarization). The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of the x-polarization and a quadrature component of the x-polarization), and two DACs 320 may supply voltage signals to the second modulator 340 (e.g., for an in-phase component of the y-polarization and a quadrature component of the y-polarization). The outputs of modulators 340 may be combined back together using combiners (e.g., optical multiplexer 214) and polarization multiplexing.

The number and arrangement of components shown in FIG. 3 are provided as an example. In practice, optical transmitter 212 may include additional components, fewer components, different components, or differently arranged components than those shown in FIG. 3. For example, the quantity of DACs 320, lasers 330, and/or modulators 340 may be selected to implement an optical transmitter 212 that is capable of generating polarization diverse signals for transmission on an optical fiber, such as link 222. Additionally, or alternatively, a set of components shown in FIG. 3 may perform one or more functions described herein as being performed by another set of components shown in FIG. 3.

Figure 4:
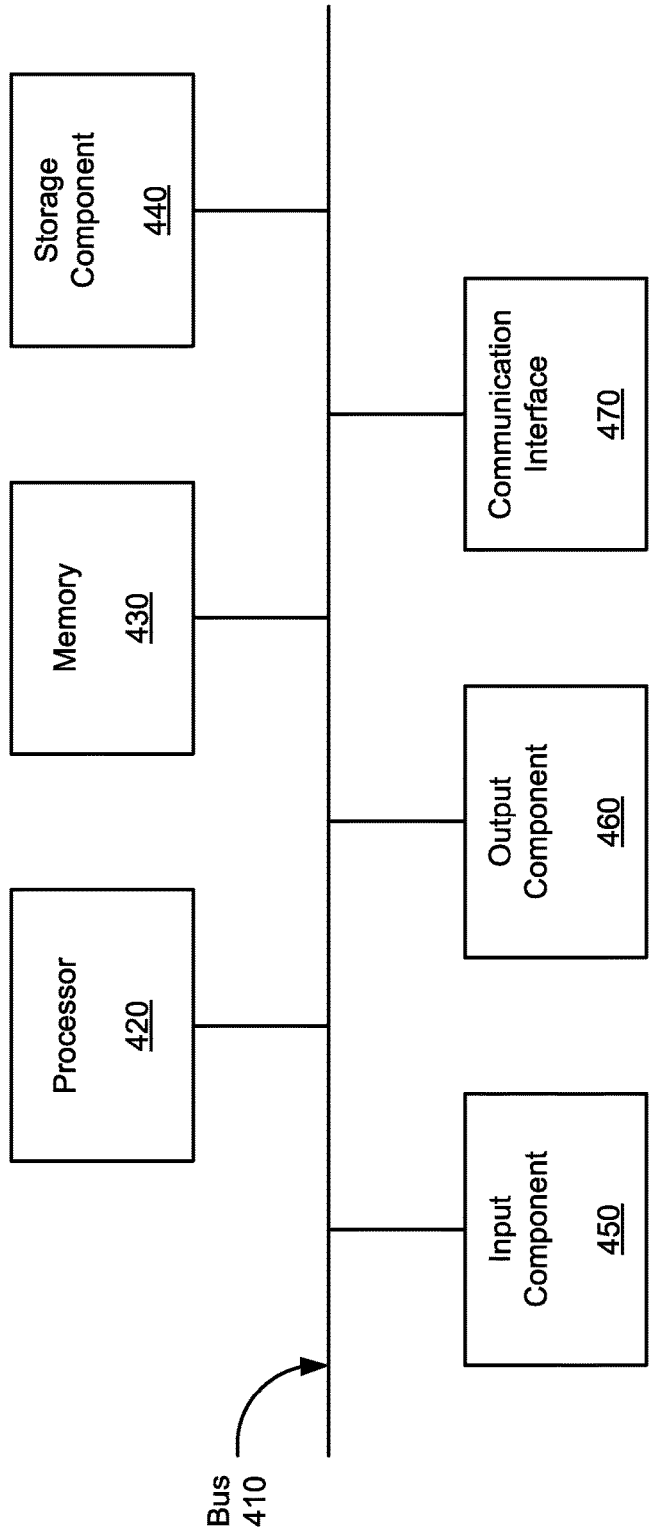
FIG. 4 is a diagram of example components of a transmitter controller shown in FIG. 2.

FIG. 4 is a diagram of example components of a device 400. Device 400 may correspond to transmitter controller 216. In some implementations, transmitter controller 216 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 may include a processor (e.g., a central processing unit (CPU), a graphics processing unit (GPU), an accelerated processing unit (APU), or the like), a microprocessor, and/or any processing component (e.g., a field-programmable gate array (FPGA), an application-specific integrated circuit (ASIC), or the like) that interprets and/or executes instructions. Memory 430 may include a random access memory (RAM), a read only memory (ROM), and/or another type of dynamic or static storage device (e.g., a flash memory, a magnetic memory, an optical memory, or the like) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, or the like). Additionally, or alternatively, input component 450 may include a sensor for sensing information (e.g., a global positioning system (GPS) component, an accelerometer, a gyroscope, an actuator, or the like). Output component 460 may include a component that provides output information from device 400 (e.g., a display, a speaker, one or more light-emitting diodes (LEDs), or the like).

Communication interface 470 may include a transceiver-like component (e.g., a transceiver, a separate receiver and transmitter, or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
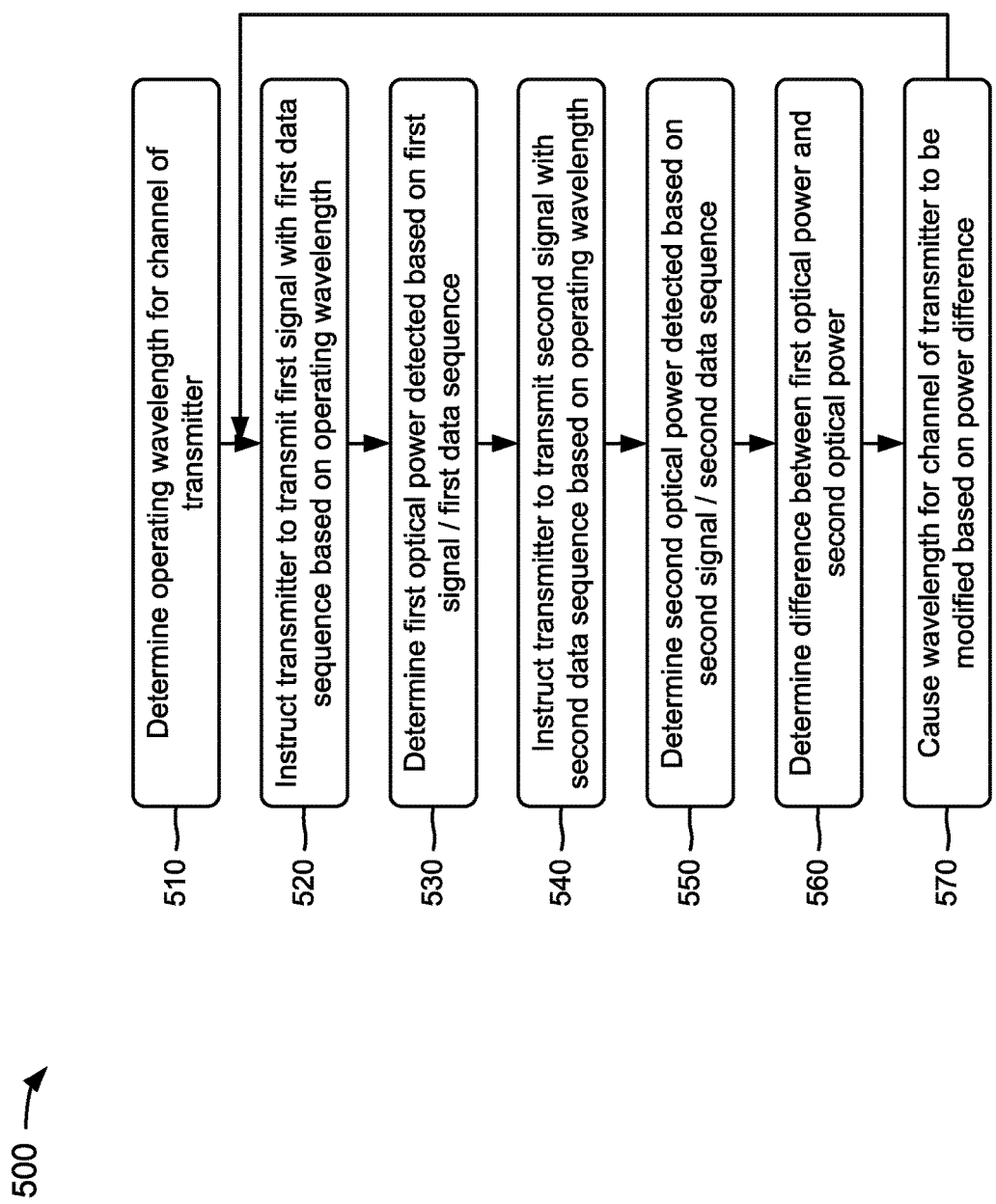
FIG. 5 is a flow chart of an example process for arbitrary wavelocking of an optical transmitter using embedded data sequences.

FIG. 5 is a flow chart of an example process 500 for arbitrary wavelocking of an optical transmitter using embedded data sequences. In some implementations, one or more process blocks of FIG. 5 may be performed by transmitter module 210 (e.g., transmitter controller 216). In some implementations, one or more process blocks of FIG. 5 may be performed by another component or a group of components separate from or including transmitter module 210.

As shown in FIG. 5, process 500 may include determining a particular operating wavelength for a channel of a transmitter (block 510). For example, an operator may utilize transmitter module 210 for providing optical signals along an optical fiber to receiver module 250. In some implementations, the operator may determine an operating wavelength, a modulation format, a baud rate, or the like for a channel of transmitter module 210 based on a length of optical fiber and/or a desired spectral efficiency. In some implementations, the operator may select a range of operating wavelengths, a modulation format, a range of baud rates, or the like for the channel.

In some implementations, the operator may provide, to transmitter module 210, the operating wavelength, the modulation format, the baud rate, or the like, and transmitter module 210 (e.g., transmitter controller 216) may receive the operating wavelength, the modulation format, the baud rate, or the like. In some implementations, transmitter controller 216 may include or be associated with a user interface that enables the operator to input the operating wavelength, the modulation format, the baud rate, or the like. In some implementations, the user interface may request additional information from the operator, such as, for example, positions of wavelength channels of transmitter module 210, a number of wavelength channels, or the like.

In some implementations, transmitter controller 216 may automatically determine the operating wavelength, the modulation format, the baud rate, or the like. For example, transmitter controller 216 may instruct optical transmitter 212 to send an optical signal to receiver module 250, and may measure a transmission time associated with the optical signal. Transmitter controller 216 may determine the length of the optical fiber based on the transmission time, and may select the operating wavelength, the modulation format, the baud rate, or the like based on the determined length of the optical fiber.

As further shown in FIG. 5, process 500 may include instructing the transmitter to transmit a first signal with a first data sequence based on the operating wavelength (block 520). For example, transmitter controller 216 may instruct optical transmitter 212 to generate a first optical signal, with a first data sequence, based on the operating wavelength. In some implementations, optical transmitter 212 may support communications over a number of wavelength channels. For example, optical transmitter 212 may support multiple channels over a particular wavelength range (e.g., the C band from 1530 to 1565 nm, the L band from 1565 to 1625 nm, etc).

In some implementations, transmitter controller 216 may identify the first data sequence by utilizing a data sequence table (provided below) that includes entries for operating frequencies ($\Delta f$) (e.g., based on operating wavelengths), entries for first data sequences associated with the operating wavelengths, and entries for second data sequences associated with the operating wavelengths. In some implementations, the first data sequences and the second data sequences may cause optical transmitter 212 to generate optical powers at fixed frequency offsets from a carrier frequency. In some implementations, the first data sequences and the second data sequences may be generated for single-polarization QPSK modulation, dual-polarization modulation, higher order (e.g., 8QAM or 16QAM) modulations, or the like. In some implementations, the first data sequences and the second data sequences may map to constellation points according to the mapping: $0\rightarrow 1+1j$; $1\rightarrow 1-1j$; $2\rightarrow -1-1j$; and $3\rightarrow -1+1j$. In some implementations, the data sequence table may include additional entries, fewer entries, different entries, or differently arranged entries than those shown below. In some implementations, the data sequence table may be provided in another data structure (e.g., a database, a list, or the like).

Data Sequence Table

| $\Delta f$ | Data Sequence 1 | Data Sequence 2 |
|---|---|---|
| −16.22 | 31021320310213102132021320313202132031320213 2021310203102031021320310231021320 | 02013023120231201312013120231302013 3120201312023130201312013120201312013 |
| −15.66 | 02132031021321320320310213213203102 13203132031020310213202132031 | 31312023130201312023120231202313013 0131202313202031312020131302 |
| −15.57 | 02132031021321320320310310310021021 021321320320310213203102132031 | 20201313020201313120202013131202012 3131202013120231302013120201312 |
| −12.78 | 2102132031031021321320320320320320 320321321321321321320320310 | 13131020203131020213132021313202013 10203132020313202021313202020203 |
| −12.63 | 31031032032032032032032032032132102 103203210210321321031032132031210 | 03132021310203102031021310213203103 20310203102031320213102031313102 |
| −12.49 | 03203203203103102102102102132132032 1021021031032032132102103103202032 | 13203132031320213102031320213132020 03131020213132020313202131020200 |
| −11.55 | 32103103210320321032102103213210310 03213210210310320320321031032 | 31021320310213102132021320313202013 20213102031020310213203102031203 |
| −11.52 | 21032103213210321032032103203201021 03203210210321210321032103203 | 02132031021321320320310213213203102 13203132031020310213202132031 |
| −10.64 | 10321032103213210321031032103203203 2103331002103210321022103210320 | 02132031021321320320310310310021021 02132132032030213120312013203213 |
| −9.88 | 10321002103210321032103210321032103 210321032103210321031132113220 | 21021320310213213203203203203202032 03203213213213213213213213202031 |
| −9.68 | 10321002210321032032103210321032132 10321032103210322032103210322 | 03203203203103102103202132132320313 2102103130320312132103132203210200 |
| −9.1 | 32100321033210321103210321032103203 10321032103210321103210321300 | 31031032032032032032032032031320210 32032102103213210310321321100 |
| −8.57 | 21032110321003210321132210332100321 1103220321103210321032103220 | 32103103210320321032102103212103211 0321032102102103102032102103221 |
| −8.08 | 03210332103321003221003221003221003 21103221032210321003211032110322 | 21032103213210320320321032103203210 3203210210321032132102132103203 |
| −7.72 | 32211033221003221003221003220321 00321103221032210321003210321322 | 10321032103213210321031032103203213 03213310021032210321032103212013 |
| −6.97 | 33211033211032210032210033210321 100322110032320032203221003220 | 10321002103210321321203203210321032 32103213210321032103113211322 |
| −6.37 | 03322110032211033221103322100322110 03221100321100332211003322110 | 10321002103210321321210321032132013 1032103213210321032320032103210322 |
| −6.08 | 10332211003221003221103321100332211 00033221100032211000332221 | 21032110321003210321032110322103332 10321103322110321103210322032 |
| −5.48 | 03221103221003221003221003321100322 11003322211003321003332211100332210 | 32100321033210321103210321032103213 2110321032110321032110321032100321 |
| −5.14 | 33222110032211003332211100033322110 21110003322110033322211100 | 00321033221003221003221003322110322 10332110321003321110321032110322 |
| −4.32 | 22211100032211003322211110032211100 11100032222110033322110003333 | 32211032221003221103221003221003222 00321103221032210321003221003220 |
| −3.87 | 22222111103322110000333332222110033 32221103322211110033333 | 33211033221032210033322100332210331 10033221100332210033221003321000 |

-continued

Data Sequence Table

| Δf | Data Sequence 1 | Data Sequence 2 |
|---|---|---|
| −3.49 | 00333332222111100000333332222222111 1111110000000333333222211111101 | 03322110032211033211033221100322110 03221100322110033221100332110 |
| −3.03 | 33322222121111111100000000000000 000000000000100000000000303333 | 10033221100332211003322110033322110 0003322211000333222110003322211 |
| −2.78 | 03333333333222222211111000003333333 222222111111110000000000000000 | 03322110032211003221100322110033222 111003322211003322110033322110 |
| −2.23 | 32222222222222222222211222222222222 22322333333333333333333332323 | 33222110033222110033322110003332211 211100003332221110003332211100 |
| −1.12 | 330000010111112222222223333333333 3333333333333333333333333333333 | 22211100003333222211110000333322211 11100033222111003332211100033 |
| −0.77 | 11112222233333300000001111111111 111111112222222222333333000001 | 22222211110000033332222111000033322 21110000332221110000003333 |
| −0.62 | 330000011111222233330000111222233 333000000111111112222222222333 | 00333322221111100000333332222222111 111111000000033333222221111101 |
| −0.18 | 011122233300011112222333300000011 111122222333330000011112223300 | 033333333332222222211110000333333 2222221111111000000000000000 |
| 0.31 | 33000111222333000111122223333300000 111122223330001112223300111220 | 333222212111111111000000000000000 000000000000001000000000000303333 |
| 0.7 | 011223300011223300111222333000111 222233300011222330011223300 | 32222222222222222222211222222222222 22322333333333333333333332323 |
| 1.7 | 011122233000112233001122330011122 3300112233001122330011122330 | 330000010111112222222223333333333 333333333333333333333333333333 |
| 1.86 | 01122300112230011223300112230011123 23330011222330011223300112230 | 1111222233333300000000011111111111 111111122222222233333330000001 |
| 2.64 | 22330011233001123300122330112330112 2230011233001123300112233001123 | 330000011111222233330000111122233 333000000111111112222222222333 |
| 2.93 | 12223011233011233011233001122330 1123 3011233011233012233001233012233 | 3300011122233300011112222333330000 1112222333000111222333001112220 |
| 3.08 | 1223001233011233011233011223001122 3001122330112233011223300122300 | 01112223330001111222233333000001122 1112223300011112222333300111220 |
| 3.67 | 230112301223012330122301222300112330 112330112330122330012301223011 | 011223300011223300111222333000111 222233300011122233001122330011220 |
| 4.8 | 23012301123012301230122301223012301 2230123001230112301230112301223012 | 01122300112233001122330011223300112 233001112223300112233001122330 |
| 5.13 | 230012301223012330122301123001330 1223011230112301223012300122301 | 01112223300011223300112233001122 33001122330112233000111223330 |
| 5.57 | 301123012301230022301230123012302 3012301230123012220012301230123 | 22330011233001123300122330112330112 22300112233001122330112233001123 |
| 5.9 | 2201230223023012301223012230122301230 1230123012301223012201230121301 | 1223001233011233011233011223001122 3001122330112233011223300122300 |
| 6.62 | 13012301230230123012301223012301220 123012301230133123012312301230 | 1223012330112330112330112230011230112 3 3011233011233012230012330122330 |
| 6.85 | 01301230120123012301230123023012301 1230123012301230123012301230123 | 230112301223012330122301222300112330 112330112330122330012301223011 |
| 7.75 | 30130123123012301230230123012013012 3012301201230230130120123123012 | 23001230122301233012230112300123230 12230112301123012230123012301 |
| 7.88 | 01231230230130130130130130130123013 0123012302301201230230123123013 | 23012301123012301230122301230123012301 22301230012301123011230112301123012 |
| 8.43 | 2012312302301301201231230230230230 23023123120120120130130130120120120 | 3011230123012300223012301230123012 30123012301230122001230123012303 |
| 8.5 | 3023023023023023123120130130123012 3012013023023123123123123123123 | 2201230223023012301230123012301230 1230123012301230112220123012301 |
| 9.74 | 13020130231201302312012013023123120 130130231201302313023120131330 | 0130123012012301230123012303301230 12312301231230123012123301203012301 |
| 10.06 | 302312013023023123120120120120130123 01302312301230230123012301231 | 13012301230230123012301230123301123 123012301230133312301231312301230 |
| 10.54 | 2013023120130231202312023120231302 31302313020130201302312013302301 | 30130123123013012302301230121301230 123013012301231301201231230123023 |
| 11.17 | 02013023120231201312013120231302013 1202013120231302013120131020123 | 01231230123013013013013013012230 01231230123012012302302301231203013 |
| 11.78 | 20201313020201313120202013131202021 313120201312023130201312020131 | 3023023023023023231201310130231231 20120130230231231231231231231231 |
| 11.9 | 31312023130201312023120231302313023 01312023130203312013023130232 | 20123123023013012012312302301302301 230231231201201201301301301201 |
| 14.78 | 131310202013102021313201313202133 1020031320203132020213132020203 | 30231201302302312312012012013013012 30130231231201302312013023120131 |
| 15.14 | 13202313203132021310203132021313202 031310202131320203132021313101200 | 13020130231201302312013023123121 01301302312013023130213212013013023 |
| 15.39 | 0313202131020310203102131021320313 20310203102031320213102031310 | 201302312013023120231202312023130 3130231302013023120131012301230 |

In some implementations, transmitter controller 216 may convert the operating wavelength into an operating frequency, and may utilize the operating frequency to identify the first data sequence in the data sequence table. For example, assume that the operating wavelength is 1550 nanometers (nm), and that transmitter controller 216 converts the operating wavelength into a frequency of 193.414 terahertz (THz) (e.g., the speed of light, 299,792,458 meters/second, divided by 0.00155 meters=193.4145 THz). Further, assume that a periodicity of detector 215 is 0.0375 THz, and that transmitter controller 216 utilizes the periodicity to calculate the operating frequency as 10.5 GHz. For example, transmitter controller 216 may divide the frequency by the periodicity (e.g., 193.414 THz/0.0375 THz) to obtain a number (e.g., 5157.7066), and then may multiply a rounded version of the number (e.g., 5158) by the periodicity (e.g., 0.0375 THz) to obtain another frequency 193.425 THz. Transmitter controller 216 may subtract the frequency from the other frequency (e.g., 193.4145 THz−193.425 THz) to obtain the operating frequency of −0.0105 THz or −10.5 GHz.

In some implementations, transmitter controller 216 may utilize the determined operating frequency (e.g., 11 GHz) to identify the first data sequence in the data sequence table. For example, transmitter controller 216 may determine that the operating frequency (e.g., −10.5 GHz) is closest to the operating frequency of −10.64 GHz in the data sequence table, and may identify the first data sequence as the first data sequence associated with −10.64 GHz (e.g., that includes the following sequence of numbers: 1 0 3 2 1 0 3 2 1 0 3 2 1 3 2 1 0 3 2 1 0 3 1 0 3 2 1 0 3 2 0 3 2 1 0 3 2 1 3 3 1 0 0 2 1 0 3 2 1 0 3 2 1 0 2 2 1 0 3 2 1 0 3 2).

In some implementations, transmitter controller 216 may generate instructions that include the identified first data sequence, and instruct optical transmitter 212 to transmit a first optical transmitter signal with the first data sequence. In some implementations, based on the instructions, optical transmitter 212 may insert the first data sequence into a data stream (e.g., between packets or frames of payload data), and may generate a first optical transmitter signal that includes the data stream and the inserted first data sequence. Optical transmitter 212 may transmit the first optical transmitter signal towards receiver module 250, and detector 215 may receive the first optical transmitter signal.

As further shown in FIG. 5, process 500 may include determining a first optical power based on the first signal and the first data sequence (block 530). For example, detector 215 may receive the first optical transmitter signal from optical transmitter 212, and may generate a filtered optical signal based on the received first optical transmitter signal. In some implementations, detector 215 may generate a first optical power (e.g., in dB) based on the first optical transmitter signal. In some implementations, detector 215 may periodically or continuously sample the first optical transmitter signal generated by optical transmitter 212. For example, detector 215 may sample the first optical transmitter signal generated by optical transmitter 212 after a particular amount of time (e.g., in microseconds, seconds, or the like). The particular amount of time may be provided by the operator to transmitter module 210 or may be preprogrammed in detector 215. In some implementations, detector 215 may sample the first optical transmitter signal generated by optical transmitter 212 more or less frequently depending upon a state of optical transmitter 212 (e.g., if the temperature of optical transmitter 212 is fluctuating, detector 215 may sample the first optical transmitter signal more frequently due to temperature drift of optical transmitter 212).

In some implementations, the first optical transmitter signal or a portion of the first optical transmitter signal generated by optical transmitter 212 may be received by detector 215, and may be provided to an etalon of detector 215. The etalon may create a filtered optical signal that depends on a wavelength of the received first optical transmitter signal. For example, the etalon may receive the first optical transmitter signal, and may provide the filtered optical signal, created by the etalon based on the first optical transmitter signal, to a photodiode of detector 215. The photodiode may create an electrical signal based on the filtered optical signal received from the etalon, and may provide the electrical signal to transmitter controller 216. In some implementations, the electrical signal may correspond to the first optical power determined by detector 215.

As further shown in FIG. 5, process 500 may include instructing the transmitter to transmit a second signal with a second data sequence based on the operating wavelength (block 540). For example, transmitter controller 216 may instruct optical transmitter 212 to generate a second optical signal, with a second data sequence, based on the operating wavelength provided by the operator. In some implementations, transmitter controller 216 may identify the second data sequence by utilizing the data sequence table (provided above).

In some implementations, transmitter controller 216 may convert the operating wavelength into an operating frequency, and may utilize the operating frequency to identify the second data sequence in the data sequence table. For example, assume that the operating wavelength is 1550 nanometers (nm), and that transmitter controller 216 converts the operating wavelength into the operating frequency of −0.0105 THz or −10.5 GHz, as described above. In such an example, transmitter controller 216 may utilize the determined operating frequency (e.g., −10.5 GHz) to identify the second data sequence in the data sequence table. Transmitter controller 216 may determine that the operating frequency (e.g., −10.5 GHz) is closest to the operating frequency of −10.64 GHz in the data sequence table, and may identify the second data sequence as the second data sequence associated with −10.64 GHz (e.g., that includes the following sequence of numbers: 0 2 1 3 2 0 3 1 0 2 1 3 2 1 3 2 0 3 2 0 3 1 0 3 1 0 3 1 0 2 1 0 2 1 0 2 1 3 2 1 3 2 0 3 2 0 3 1 0 2 1 3 2 0 3 1 0 2 1 3 2 0 3 1).

In some implementations, transmitter controller 216 may generate instructions that include the identified second data sequence, and instruct optical transmitter 212 to transmit a second optical transmitter signal with the second data sequence. In some implementations, based on the instructions, optical transmitter 212 may insert the second data sequence into a data stream (e.g., between packets or frames of payload data), and may generate a second optical transmitter signal that includes the data stream and the inserted second data sequence. Optical transmitter 212 may transmit the second optical transmitter signal towards receiver module 250, and detector 215 may receive the second optical transmitter signal.

As further shown in FIG. 5, process 500 may include determining a second optical power based on the second signal and the second data sequence (block 550). For example, detector 215 may receive the second optical transmitter signal from optical transmitter 212, and may generate a filtered optical signal based on the received second optical transmitter signal. In some implementations, detector 215 may generate a second optical power (e.g., in dB) based on the second optical transmitter signal. In some implementations, detector 215 may periodically or continuously sample the second optical transmitter signal generated by optical transmitter 212. For example, detector 215 may sample the second optical transmitter signal generated by optical transmitter 212 after a particular amount of time (e.g., in microseconds, seconds, or the like). The particular amount of time may be provided by the operator to transmitter module 210 or may be preprogrammed in detector 215. In some implementations, detector 215 may sample the second optical transmitter signal generated by optical transmitter 212 more or less frequently depending upon a state of optical transmitter 212 (e.g., if the temperature of optical transmitter 212 is fluctuating, detector 215 may sample the first optical transmitter signal more frequently due to temperature drift of optical transmitter 212).

In some implementations, the second optical transmitter signal or a portion of the second optical transmitter signal generated by optical transmitter 212 may be received by detector 215, and may be provided to an etalon of detector 215. The etalon may create a filtered optical signal that depends on a wavelength of the received second optical transmitter signal. For example, the etalon may receive the second optical transmitter signal, and may provide the filtered optical signal, created by the etalon based on the second optical transmitter signal, to a photodiode of detector 215. The photodiode may create an electrical signal based on the filtered optical signal received from the etalon, and may provide the electrical signal to transmitter controller 216. In some implementations, the electrical signal may correspond to the second optical power determined by detector 215.

As further shown in FIG. 5, process 500 may include determining a difference between the first optical power and the second optical power (block 560). For example, transmitter controller 216 may determine a difference between the first optical power and the second optical power received from detector 215. In some implementations, transmitter controller 216 may average the first optical power, may average the second optical power, and may calculate a power difference between the averaged first optical power and the averaged second optical power.

In some implementations, the calculated power difference observed by transmitter controller 216 may follow a characteristic response as a function of frequency offset. Transmitter controller 216 may seek a point on the graph where the power difference goes through zero dB with a positive slope, and may identify a frequency associated with the point. In some implementations, the identified frequency may include a frequency where a carrier signal of optical transmitter 212 is offset from a fixed frequency of detector 215, and may be referred to as a wavelocking frequency or a frequency offset.

As further shown in FIG. 5, process 500 may include causing the wavelength for the channel of the transmitter to be modified based on the power difference (block 570) and returning to process block 520. For example, transmitter controller 216 may modify the wavelength for the channel of optical transmitter 212 based on the determined power difference. In some implementations, transmitter controller 216 may increase the wavelength of optical transmitter 212 based on the power difference (e.g., the power difference is greater than zero). In some implementations, transmitter controller 216 may decrease the wavelength of optical transmitter 212 based on the power difference (e.g., the power difference is greater than zero). In some implementations, transmitter controller 216 may determine that the wavelength of optical transmitter 212 is locked at the correct location (e.g. the power difference is close to zero). In some implementations, transmitter controller 216 may instruct optical transmitter 212 to generate an optical transmitter signal for the channel and at the modified wavelength. Based on the instruction, optical transmitter 212 may transmit the optical transmitter signal at the modified wavelength. In some implementations, optical transmitter 212 may adjust the wavelength of an optical transmitter signal, generated by laser 330, to the modified wavelength by tuning laser 330 to the modified wavelength. In some implementations, optical transmitter 212 may adjust the wavelength of an optical transmitter signal, generated by laser 330, to the modified wavelength by changing a temperature of laser 330 until the modified wavelength is achieved.

In some implementations, transmitter controller 216 may continuously monitor the channel (e.g., via detector 215), and may modify the wavelength for the channel of optical transmitter 212, as described above. In some implementations, transmitter controller 216 may periodically monitor the channel (e.g., via detector 215), and may modify the wavelength for the channel of optical transmitter 212, as described above. In some implementations, the periodic monitoring may be accomplished by inserting sequences between packets or frames of payload data. In some implementations, transmitter module 210 may monitor all channels generated by other optical transmitters 212, and may modify the wavelengths for the channels of the other optical transmitters 212, as described above. In some implementations, process 500 may enable multiple optical transmitters 212 and multiple channels, in an integrated optical system, to be simultaneously wavelocked to any arbitrary wavelength. In some implementations, process 500 may provide an accurate and spectrally efficient integrated optical system since channel wavelengths may have very precise relative alignment.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6B:
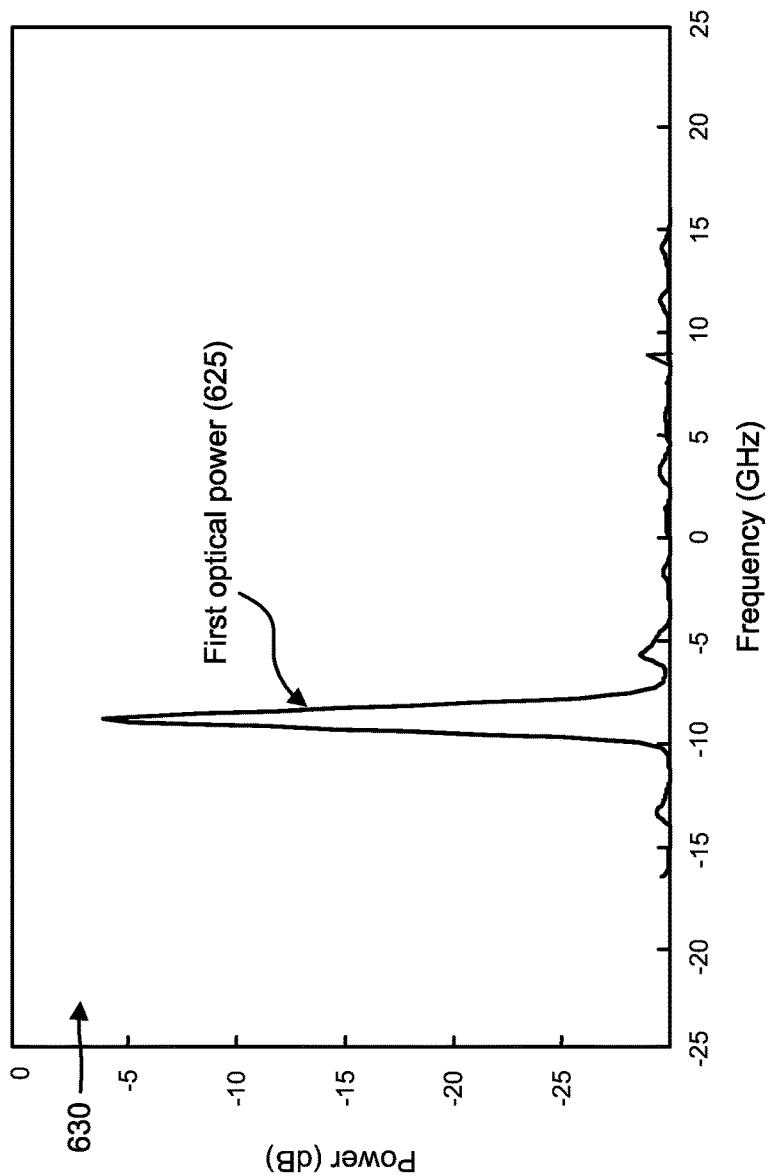

FIGS. 6A-6F are diagrams of an example implementation 600 relating to example process 500 shown in FIG. 5. In example implementation 600, assume that an operator wants to utilize transmitter module 210 for providing optical signals along an optical fiber to receiver module 250. Further, assume that the operator determines a particular wavelength 605 for a channel based on a length of optical fiber and/or a desired spectral efficiency. The operator may provide information identifying particular wavelength 605 for the channel to transmitter controller 216 of transmitter module 210, as shown in FIG. 6A.

Transmitter controller 216 may convert particular wavelength 605 into an operating frequency, and may utilize the operating frequency to identify a first data sequence 610 in the data sequence table. For example, assume that transmitter controller 216 converts particular wavelength 605 into an operating frequency of −10.64 GHz. Transmitter controller 216 may utilize the determined operating frequency (e.g., −10.64 GHz) to identify first data sequence 610 in the data sequence table. As further shown in FIG. 6A, transmitter controller 216 may identify first data sequence 610 to include the following sequence of numbers: 1 0 3 2 1 0 3 2 1 0 3 2 1 3 2 1 0 3 2 1 0 3 1 0 3 2 1 0 3 2 0 3 2 1 0 3 2 1 3 3 1 0 0 2 1 0 3 2 1 0 3 2 1 0 2 2 1 0 3 2 1 0 3 2.

As further shown in FIG. 6A, transmitter controller 216 may generate an instruction 615 that includes first data sequence 610, and instructs optical transmitter 212 to transmit a first transmitter signal 620 with first data sequence 610. Transmitter controller 216 may provide instruction 615 to optical transmitter 212, and optical transmitter 212 may receive instruction 615. Based on instruction 615, optical transmitter 212 may insert first data sequence 610 into a data stream (e.g., between packets or frames of payload data), and may generate first transmitter signal 620 that includes the data stream and first data sequence 610. Optical transmitter 212 may transmit first transmitter signal 620, and detector 215 may receive first transmitter signal 620.

As further shown in FIG. 6A, detector 215 may determine a first optical power 625 based on first transmitter signal 620. An etalon of detector 215 may create a filtered optical signal that depends on a wavelength of first transmitter signal 620. For example, the etalon may receive first transmitter signal 620, and may provide the filtered optical signal, created by the etalon based on first transmitter signal 620, to a photodiode of detector 215. The photodiode may create an electrical signal based on the filtered optical signal received from the etalon, and may provide the electrical signal to transmitter controller 216. The electrical signal may correspond to first optical power 625 determined by detector 215. The optical spectrum of first optical power 625 may be depicted in a graphical form 630, as shown in FIG. 6B.

As shown in FIG. 6C, transmitter controller 216 may utilize the operating frequency to identify a second data sequence 635 in the data sequence table. For example, based on the operating frequency of −10.64 GHz, transmitter controller 216 may identify second data sequence 635 to include the following sequence of numbers: 0 2 1 3 2 0 3 1 0 2 1 3 2 1 3 2 0 3 2 0 3 1 0 3 1 0 3 1 0 2 1 0 2 1 0 2 1 3 2 1 3 2 0 3 2 0 3 1 0 2 1 3 2 0 3 1 0 2 1 3 2 0 3 1. As further shown in FIG. 6C, transmitter controller 216 may generate an instruction 640 that includes second data sequence 635, and instructs optical transmitter 212 to transmit a second transmitter signal 645 with second data sequence 635. Transmitter controller 216 may provide instruction 640 to optical transmitter 212, and optical transmitter 212 may receive instruction 640. Based on instruction 640, optical transmitter 212 may insert second data sequence 635 into a data stream (e.g., between packets or frames of payload data), and may generate second transmitter signal 645 that includes the data stream and second data sequence 635. Optical transmitter 212 may transmit second transmitter signal 645, and detector 215 may receive second transmitter signal 645.

As further shown in FIG. 6C, detector 215 may generate a second optical power 650 based on second transmitter signal 645. The etalon of detector 215 may create a filtered optical signal that depends on a wavelength of second transmitter signal 645. For example, the etalon may receive second transmitter signal 645, and may provide the filtered optical signal, created by the etalon based on second transmitter signal 645, to the photodiode of detector 215. The photodiode may create an electrical signal based on the filtered optical signal received from the etalon, and may provide the electrical signal to transmitter controller 216. The electrical signal may correspond to second optical power 650 determined by detector 215.

Figure 6D:
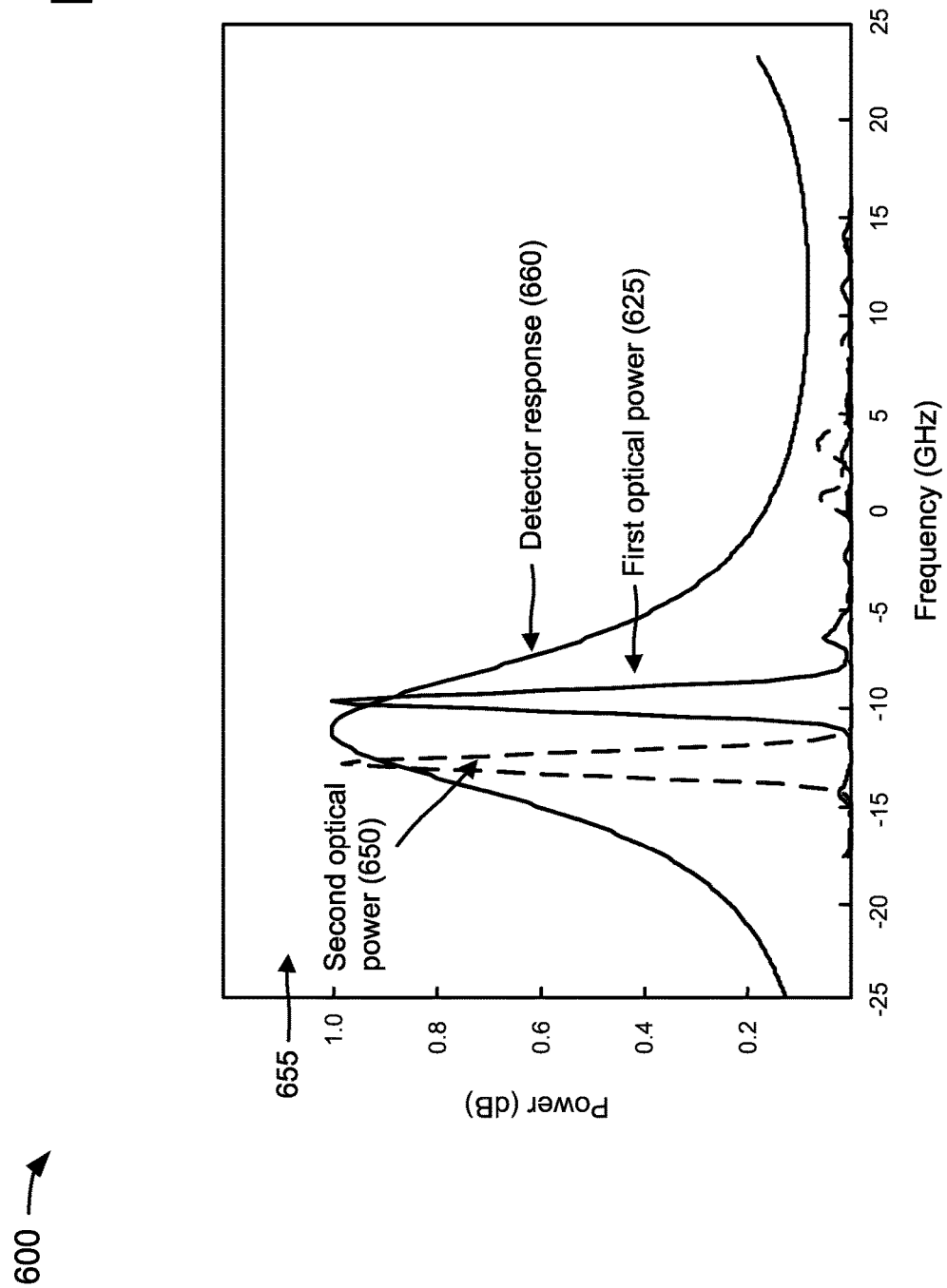

The optical spectrum of second transmitter signal 645 (e.g., second optical power 650) may be depicted in a graphical form 655, as shown in FIG. 6D. As further shown in FIG. 6D, the optical spectrum of second transmitter signal 645 (e.g., second optical power 650) may be depicted with the optical spectrum of first transmitter signal 620 (e.g., first optical power 625) and a detector response 660. Detector response 660 may include a fixed filter response generated by the etalon of detector 215.

Figure 6E:
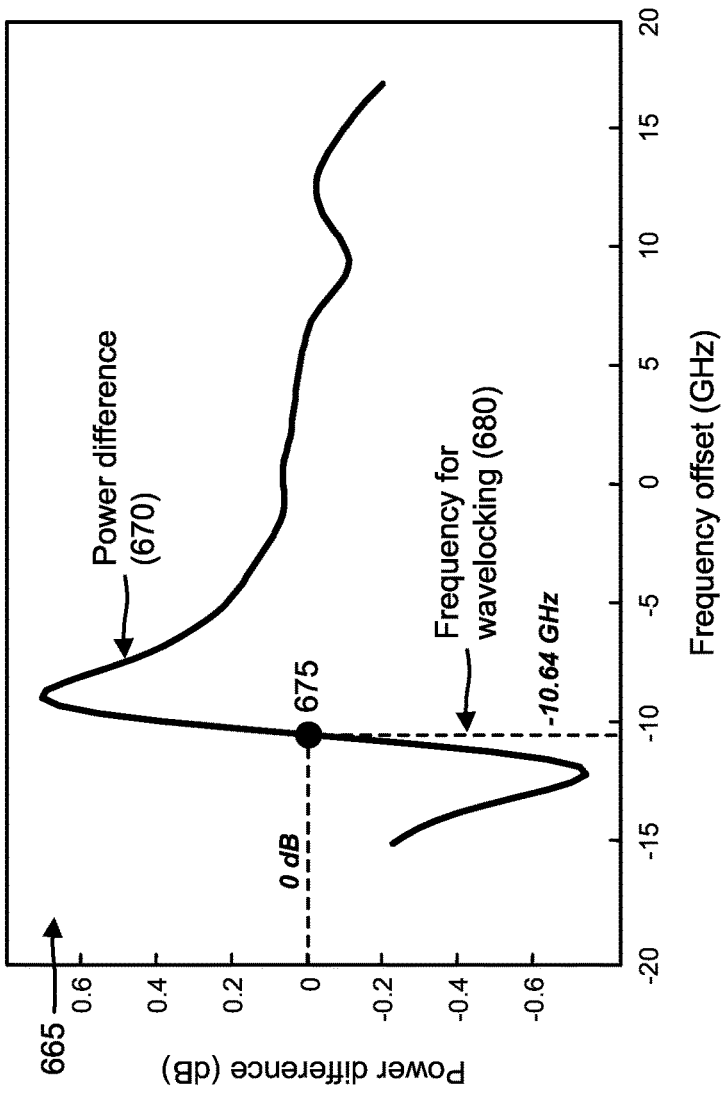

Transmitter controller 216 may determine a difference between first optical power 625 and second optical power 650 received from detector 215. Transmitter controller 216 may average first optical power 625, may average second optical power 650, and may calculate a power difference between the averaged first optical power 625 and the averaged second optical power 650. As shown in FIG. 6E, a characteristic response may look like a graph 665 that shows a power difference 670 (e.g., in dB) at different frequencies (e.g., in GHz). Transmitter controller 216 may seek a point 675 on graph 665 where power difference 670 goes through zero dB with a positive slope, and may identify a frequency 680 (e.g., −10.64 GHz) associated with point 675. Frequency 680 may include a frequency where a carrier signal of optical transmitter 212 is offset from a fixed frequency of detector 215, and may be referred to as a frequency for wavelocking.

Figure 6F:
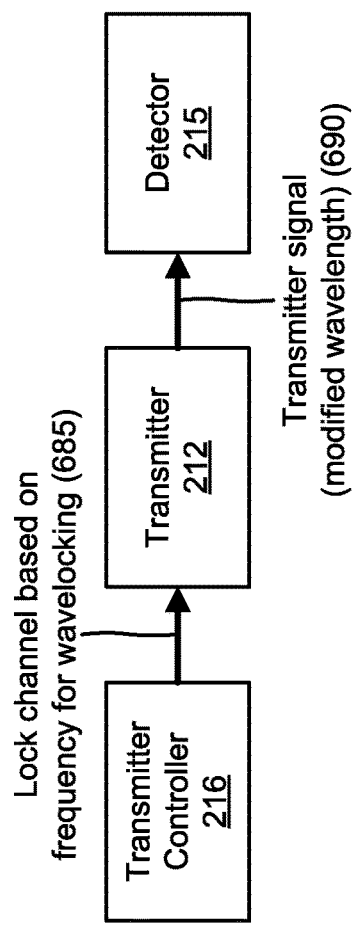

As indicated by reference number 685 in FIG. 6F, transmitter controller 216 may lock the channel of optical transmitter 212 based on frequency 680. In some implementations, transmitter controller 216 may increase the wavelength of optical transmitter 212 based on the power difference (e.g., the power difference is greater than zero). In some implementations, transmitter controller 216 may decrease the wavelength of optical transmitter 212 based on the power difference (e.g., the power difference is greater than zero). In some implementations, transmitter controller 216 may determine that the wavelength of optical transmitter 212 is locked at the correct location (e.g. the power difference is close to zero). Transmitter controller 216 may modify the wavelength of optical transmitter 212 based on the modified frequency. Transmitter controller 216 may instruct optical transmitter 212 to generate a transmitter signal 690 for the channel at the modified wavelength. Based on the instruction, optical transmitter 212 may transmit transmitter signal 690 at the modified wavelength, as further shown in FIG. 6F.

As indicated above, FIGS. 6A-6F are provided merely as an example. Other examples are possible and may differ from what was described with regard to FIGS. 6A-6F. In some implementations, the various operations described in connection with FIGS. 6A-6F may be performed automatically or at the request of the operator.

Systems and/or methods, described herein, may enable arbitrary wavelocking of an optical transmitter using embedded data sequences that generate optical power at a fixed frequency offset from a carrier optical signal. By selecting a data sequence corresponding to the fixed frequency offset, the systems and/or methods may enable locking a channel to an arbitrary wavelength. The systems and/or methods may enable multiple transmitters and multiple channels, in an integrated optical system, to be simultaneously wavelocked to any arbitrary wavelength. The systems and/or methods may provide an accurate and spectrally efficient integrated optical system since channel wavelengths may have very precise relative alignment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical system, comprising:
    an optical transmitter;
    a detector; and
    a controller configured to:
        receive information associated with a particular wavelength for a channel of the optical transmitter;
        instruct the optical transmitter to transmit a first optical signal with a first data sequence that is determined based on the particular wavelength;
        receive, from the detector, a first optical power that is generated based on the first optical signal and the first data sequence;
        instruct the optical transmitter to transmit a second optical signal with a second data sequence that is determined based on the particular wavelength;
        receive, from the detector, a second optical power that is generated based on the second optical signal and the second data sequence;
        determine a power difference between the first optical power and the second optical power; and
        cause the particular wavelength for the channel to be modified based on the determined power difference,
    where, when instructing the optical transmitter to transmit the first optical signal with the first data sequence, the controller is further configured to:
    determine a frequency associated with the particular wavelength;
    identify, in a data structure, the first data sequence based on the frequency;
    generate an instruction that includes the first data sequence and instructs the optical transmitter to transmit the first optical signal with the first data sequence; and
    provide the instruction to the optical transmitter.

2. The optical system of claim 1, where the controller is further configured to:
    instruct the optical transmitter to transmit a final optical signal based on the modified particular wavelength; and
    where the optical transmitter is configured to:
        transmit the final optical signal, at the modified particular wavelength, based on the instruction to transmit the final optical signal.

3. The optical system of claim 1, where the controller is further configured to:
    lock the modified particular wavelength as a wavelength for the channel of the optical transmitter.

4. The optical system of claim 1, where, when causing the particular wavelength for the channel to be modified based on the determined power difference, the controller is further configured to:
    increase the particular wavelength for the channel based on the determined power difference.

5. The optical system of claim 1, where the first data sequence and the second data sequence cause the optical transmitter to generate optical powers at frequency offsets from a carrier frequency of the optical transmitter.

6. The optical system of claim 1, where, when determining the power difference between the first optical power and the second optical power, the controller is further configured to:
    determine a frequency associated with the power difference; and
    when causing the particular wavelength for the channel to be modified, the controller is further configured to:
        cause the particular wavelength for the channel to be modified based on the frequency associated with the power difference.

7. An optical system, comprising:
    an optical transmitter;
    a detector; and
    a controller configured to:
        receive information associated with a particular wavelength for a channel of the optical transmitter;
        instruct the optical transmitter to transmit a first optical signal with a first data sequence that is determined based on the particular wavelength;
        receive, from the detector, a first optical power that is generated based on the first optical signal and the first data sequence;
        instruct the optical transmitter to transmit a second optical signal with a second data sequence that is determined based on the particular wavelength;
        receive, from the detector, a second optical power that is generated based on the second optical signal and the second data sequence;
        determine a power difference between the first optical power and the second optical power; and
    cause the particular wavelength for the channel to be modified based on the determined power difference,
    where, when instructing the optical transmitter to transmit the second optical signal with the second data sequence, the controller is further configured to:
    determine a frequency associated with the particular wavelength;
    identify, in a data structure, the second data sequence based on the frequency;
    generate an instruction that includes the second data sequence and instructs the optical transmitter to transmit the second optical signal with the second data sequence; and
    provide the instruction to the optical transmitter.

8. An optical system, comprising:
    an optical transmitter; and
    a controller configured to:
        determine a particular wavelength for a channel of the optical transmitter;

cause the optical transmitter to transmit a first optical signal with a first data sequence that is determined based on the particular wavelength;

determine a first optical power that is generated based on the first optical signal and the first data sequence;

cause the optical transmitter to transmit a second optical signal with a second data sequence that is determined based on the particular wavelength;

determine a second optical power that is generated based on the second optical signal and the second data sequence;

calculate a power difference between the first optical power and the second optical power; and cause the particular wavelength for the channel to be modified based on the calculated power difference, where, when causing the optical transmitter to transmit the first optical signal with the first data sequence, the controller is further configured to:

determine a frequency associated with the particular wavelength;

determine the first data sequence based on the frequency;

generate an instruction that includes the first data sequence and instructs the optical transmitter to transmit the first optical signal with the first data sequence; and provide the instruction to the optical transmitter.

9. The optical system of claim 8, where the controller is further configured to:

cause the optical transmitter to transmit a final optical signal based on the modified particular wavelength.

10. The optical system of claim 8, where the controller is further configured to:

lock the modified particular wavelength as a wavelength for the channel of the optical transmitter.

11. The optical system of claim 8, where, when causing the particular wavelength for the channel to be modified based on the calculated power difference, the controller is further configured to:

decrease the particular wavelength for the channel based on the calculated power difference.

12. The optical system of claim 8, where the first data sequence is different than the second data sequence.

13. The optical system of claim 8, where, when calculating the power difference between the first optical power and the second optical power, the controller is further configured to:

determine a frequency associated with the calculated power difference; and when causing the particular wavelength for the channel to be modified, the controller is further configured to:

cause the particular wavelength for the channel to be modified based on the frequency associated with the calculated power difference.

14. An optical system, comprising:

an optical transmitter; and a controller configured to:

determine a particular wavelength for a channel of the optical transmitter;

cause the optical transmitter to transmit a first optical signal with a first data sequence that is determined based on the particular wavelength;

determine a first optical power that is generated based on the first optical signal and the first data sequence;

cause the optical transmitter to transmit a second optical signal with a second data sequence that is determined based on the particular wavelength;

determine a second optical power that is generated based on the second optical signal and the second data sequence;

calculate a power difference between the first optical power and the second optical power; and cause the particular wavelength for the channel to be modified based on the calculated power difference, where, when causing the optical transmitter to transmit the second optical signal with the second data sequence, the controller is further configured to:

determine the second data sequence based on the frequency;

generate another instruction that includes the second data sequence and instructs the optical transmitter to transmit the second optical signal with the second data sequence; and provide the other instruction to the optical transmitter.

* * * * *